US006678936B2

(12) United States Patent
Izumi et al.

(10) Patent No.: US 6,678,936 B2
(45) Date of Patent: Jan. 20, 2004

(54) VEHICLE BODY COATING METHOD FOR AUTOMOBILE

(75) Inventors: Koichiro Izumi, Wako (JP); Masataka Kumata, Wako (JP); Yasuhiro Yamada, Wako (JP)

(73) Assignee: Honda Giken Kogyo Kabushiki Kaisha, Tokyo (JP)

( * ) Notice: Subject to any disclaimer, the term of this patent is extended or adjusted under 35 U.S.C. 154(b) by 0 days.

(21) Appl. No.: 10/187,710

(22) Filed: Jul. 1, 2002

(65) Prior Publication Data
US 2002/0162210 A1 Nov. 7, 2002

Related U.S. Application Data (62) Division of application No. 09/611,970, filed on Jul. 6, 2000, now abandoned.

(30) Foreign Application Priority Data

Jul. 9, 1999 (JP) ........................................... 11-196779

(51) Int. Cl.[7] ................................................. B23P 19/04
(52) U.S. Cl. ........................ 29/460; 29/458; 29/527.4; 428/624; 428/623; 427/410
(58) Field of Search .............................. 29/527.1, 527.2, 29/527.4, 460, 458, 459; 428/623, 626, 659, 624; 427/409, 410

(56) References Cited

U.S. PATENT DOCUMENTS

| 4,659,631 A | 4/1987 | Kurimoto et al. | ............ 428/659 |
| 4,940,639 A | 7/1990 | Ohshima et al. | ............ 428/659 |
| 5,288,356 A | * 2/1994 | Benefiel | ...................... 29/458 |
| 5,330,850 A | 7/1994 | Suzuki et al. | ................ 428/659 |

FOREIGN PATENT DOCUMENTS

| JP | 05115839 A | * 5/1993 | ................. 427/409 |
| JP | 5-115839 | 10/1994 | |
| JP | 9-131568 | 12/1995 | |

* cited by examiner

Primary Examiner—Gregory Vidovich
Assistant Examiner—Marc Jimenez
(74) Attorney, Agent, or Firm—Merchant & Gould, P.C.

(57) ABSTRACT

A coating method according to the present invention includes a step of producing plural exterior members which constitute the outside portion of a vehicle body, and a step of forming and joining plural inside members which constitute the inside portion of the vehicle body, thereby producing a chassis. Each of the exterior members is a precoat metal sheet in which a rust-preventing layer and a coat which contains a lubricating component are formed on a surface of a metal sheet. Accordingly, the exterior members joined to the chassis need only intermediate coating and overcoating. The chassis constituent members are made of a precoat metal sheet in which a rust-preventing layer which contains a lubricating component is formed on a surface of a metal sheet. Accordingly, it is not necessary to carry out electrodeposition coating which is considered to be necessary for the chassis.

7 Claims, 6 Drawing Sheets

VEHICLE BODY COATING METHOD FOR AUTOMOBILE

This is a divisional of application Ser. No. 09/611,970, filed Jul. 6, 2000, now abandoned.

BACKGROUND OF THE INVENTION

1. Field of the Invention

The present invention relates to an improvement in a coating method for the vehicle body of an automobile.

2. Description of the Related Art

In the production of the vehicle body of an automobile, a steel sheet material or an aluminum alloy sheet is press-formed into interior members of the vehicle body such as a floor panel and an inner panel, and the obtained formed members are joined together, as by welding, to produce a chassis which is the skeleton of the vehicle body. Similarly, a steel sheet material or an aluminum alloy sheet is press-formed into exterior members of the vehicle body such as doors, a roof, fenders, a bonnet and a trunk lid, and the exterior members are joined to the chassis. After that, coating is performed to produce the vehicle body.

The surfaces of such steel sheet material and aluminum alloy sheet are coated with a lubricant so that they can easily be press-formed. For this reason, a coating process which follows the press-forming process or the assembly of the chassis generally includes the following steps:

(1) a degreasing and cleaning step (the lubricant on the press-formed steel sheet or aluminum alloy sheet is removed, and in general, an alkali degreaser is used);

(2) a before-coating treatment step (after degreasing, a conversion treatment intended for surface adjustment and an increase in coat adhesion is performed);

(3) an undercoating step (undercoating is performed by electrodeposition coating for the purposes of rust prevention);

(4) an intermediate coating step (the irregularities of the undercoated surfaces are corrected to improve the finish of the following overcoating and to increase chipping resistance); and (5) an overcoating step (overcoating is performed to give the coated surfaces an aesthetic appearance as well as weather resistance, chemical resistance, wear resistance and the like).

In this manner, the general vehicle body coating method includes a large number of steps and carries out coating along a serial line, so that the coating line is extremely long. In steps such as rust prevention treatment and undercoating, since electrodeposition coating is performed, an immersion coating device or the like is needed. For this reason, large equipment is needed, so that high costs are required for the maintenance and management of the equipment.

The automobile coating method disclosed in Japanese Patent Laid-Open Publication No. HEI-5-115839 has heretofore been known as a coating method which enables an electrodeposition tank and a coating device to be reduced in size.

In this coating method, a chassis is formed from an aluminum alloy, and after the chassis has been subjected to a before-coating treatment, exterior members such as doors, a bonnet, fenders and a roof are subjected to electrodeposition coating followed by finish coating, separately from the chassis.

In this coating method, since the exterior members are subjected to electrodeposition coating followed by finish coating, separately from the chassis, equipment such as an electrodeposition tank and a coating device is reduced in size, and the throwing power of electrodeposition coat is improved and the finish coating is improved.

In Japanese Patent Laid-Open Publication No. HEI-9-131568, a surface-treated aluminum alloy sheet in which a lubricative coat is formed on an aluminum alloy sheet in advance is proposed as a precoat aluminum alloy sheet for a vehicle body constituent material.

The present inventors have made examinations as to whether the coating of a vehicle body can be made simple by developing the coating method of the above-cited Japanese Patent Laid-Open Publication No. HEI-5-115839, and have found out that the coating of a vehicle body can be simplified to a great extent, by noting the above-described precoat aluminum alloy sheet.

Moreover, in order to reduce the weight of the vehicle body of an automobile, particularly, to improve fuel consumption and the like, the present inventors have noted an aluminum-alloy-made vehicle body which has recently been adopted in a wide range of applications, and have made the invention.

SUMMARY OF THE INVENTION

An object of the present invention is to provide a vehicle body coating method for an automobile which enables vehicle body constituent members or a coating process to be simplified to achieve easy coating work, thereby reducing a reduction in the entire coating line.

According to a first aspect of the present invention, there is provided a vehicle body coating method for an automobile, which comprises: a step of press-forming a precoat metal sheet in which a rust-preventing layer and a coat which contains a lubricating component are formed on at least an outside surface of a metal sheet, thereby producing plural exterior members, such as a bonnet, a trunk lid, doors and fenders, which constitute an outside of a vehicle body; a step of press-forming a precoat metal sheet in which a rust-preventing layer which contains a lubricating component is formed on a surface of the metal sheet, thereby producing plural inside members, such as a floor panel and an inner panel, which constitute an inside of the vehicle body, and joining the inside members to produce a chassis for the automobile; a step of joining the exterior members to the chassis; and a step of performing intermediate coating and overcoating in order on surfaces of the exterior members joined to the chassis.

In the first aspect of the invention, it is not necessary to perform conversion treatment on the inside members and the exterior members of the vehicle body, and it is not necessary to perform electrodeposition coating required for the chassis. Specifically, it is not necessary to perform any of the step of degreasing and cleaning a press-formed metal sheet, the step of drying the metal sheet, the step of adjusting the surfaces of the metal sheet, a conversion treatment step which performs rust-preventing treatment on the surfaces, and a rust-preventing electrodeposition coating step, all of which steps have been required in the related art vehicle body coating method. In particular, since the exterior members which constitute the outside of the vehicle body need only intermediate coating and overcoating, the coating of the exterior members can be implemented with a spray type of electrodeposition coating device, whereby coating work is made simple and coating equipment can be made small and simple. Drying and fixing equipment for intermediate coating and overcoating can also be made small and simple.

On the reverse surface of each of the exterior members, a rust-preventing layer made of a conversion treatment coat is formed on the metal sheet, and a coat which contains a lubricating component is formed on the surface of the rust-preventing layer. It is preferable that a specific example of the coat be an organic coat which contains an epoxy resin and a lubricating component, because rust-preventing characteristics, adhesion and lubrication can function effectively.

On the obverse surface of each of the exterior members, a rust-preventing layer made of a conversion treatment coat is formed on the metal sheet, and a coat which contains a lubricating component and aims to improve the finish (appearance and durability) of the overcoating is formed on a surface of the rust-preventing layer. It is preferable that a specific example of the coat be, for example, an organic coat which contains a polyester resin and the lubricating component, because the organic film excels in surface smoothness, weather resistance and lubrication.

Moreover, each of the exterior members may be made of an aluminum alloy excellent in rust-preventing characteristics.

Part or all of the inside members which constitute the chassis may be made of an aluminum alloy.

According to a second aspect of the present invention, there is provided a vehicle body coating method for an automobile which comprises: a step of press-forming a precoat metal sheet in which a rust-preventing layer and a coat which contains a lubricating component and-aims to improve the finish (appearance and durability) of overcoating are formed in that order on at least an outside surface of a metal sheet, thereby producing plural exterior members, such as a bonnet, a trunk lid, doors and fenders, which constitute an outside of a vehicle body; a step of press-forming a precoat metal sheet in which a rust-preventing layer which contains a lubricating component is formed on a surface of a metal sheet, thereby producing plural inside members, such as a floor panel and an inner panel, which constitute an inside of the vehicle body, and joining the inside members to produce a chassis for the automobile; a step of joining the exterior members to the chassis; and a step of performing overcoating on surfaces of the exterior members joined to the chassis.

In the second aspect of the invention, as in the first aspect thereof, it is not necessary to perform conversion treatment on the inside members and the exterior members of the vehicle body, and it is not necessary to perform electrodeposition coating required for the chassis. Specifically, it is not necessary to perform any of the step of degreasing and cleaning a press-formed metal sheet, the step of drying the metal sheet, the step of adjusting the surfaces of the metal sheet, a conversion treatment step which performs rust-preventing treatment on the surfaces, and a rust-preventing electrodeposition coating step, all of which steps have been required in the related art vehicle body coating method. In particular, since the exterior members which constitute the outside of the vehicle body need only overcoating, the coating of the exterior members can be implemented with a spray type of electrodeposition coating device, whereby coating work is made simple and coating equipment can be made small and simple. Drying and fixing equipment for overcoating can also be made small and simple.

According to a third aspect of the present invention, there is provided a vehicle body coating method for an automobile which comprises: a step of press-forming a precoat metal sheet in which a rust-preventing layer and a coat which contains a lubricating component are formed on at least an outside surface of a metal sheet, thereby producing plural exterior members, such as a bonnet, a trunk lid, doors and fenders, which constitute an outside of a vehicle body; a step of forming plural chassis constituent members from sheet materials, profiles or castings, each made of an aluminum alloy, and joining the chassis constituent members to produce a chassis for the automobile; a step of joining the exterior members to the chassis; and a step of performing intermediate coating and overcoating on surfaces of the exterior members joined to the chassis.

The plural sheet materials, profiles and castings which constitute the chassis are made of an aluminum alloy, and the aluminum alloy itself has rust-preventing characteristics. Accordingly, a precoat can also be omitted, but rust-preventing treatment work can easily be carried out. In other words, the conversion treatment of the inside members of the vehicle body can be omitted or simplified.

The exterior members do not need conversion treatment or electrodeposition coating, and it is not necessary to carry out electrodeposition coating which is considered to be necessary for the chassis. Since the exterior members need only intermediate coating and overcoating, coating work can be simplified.

According to a fourth aspect of the present invention, there is provided a vehicle body coating method for an automobile which comprises: a step of press-forming a precoat metal sheet in which a rust-preventing layer and a coat which contains a lubricating component and aims to improve the finish (appearance and durability) of overcoating are formed in that order on at least an outside surface of a metal sheet, thereby producing plural exterior members, such as a bonnet, a trunk lid, doors and fenders, which constitute an outside of a vehicle body; a step of forming plural chassis constituent members from sheet materials, profiles or castings, each made of an aluminum alloy, and joining the chassis constituent members to produce a chassis for the automobile; a step of joining the exterior members to the chassis; and a step of performing overcoating on surfaces of the exterior members joined to the chassis.

Although the effects and advantages of the fourth aspect of the invention are approximately the same as those of the third aspect of the invention, the exterior members whose obverse surfaces respectively have the coats aiming to improve the finish of overcoating, so that the exterior members need only overcoating and coating work can be simplified.

BRIEF DESCRIPTION OF THE DRAWINGS

Certain preferred embodiments of the present invention will be described below in detail, by way of example only, with reference to the accompanying drawings, in which.

DETAILED DESCRIPTION OF THE PREFERRED EMBODIMENTS

The following description is merely exemplary in nature and is in no way intended to limit the invention, its application or uses.

Figure 1:
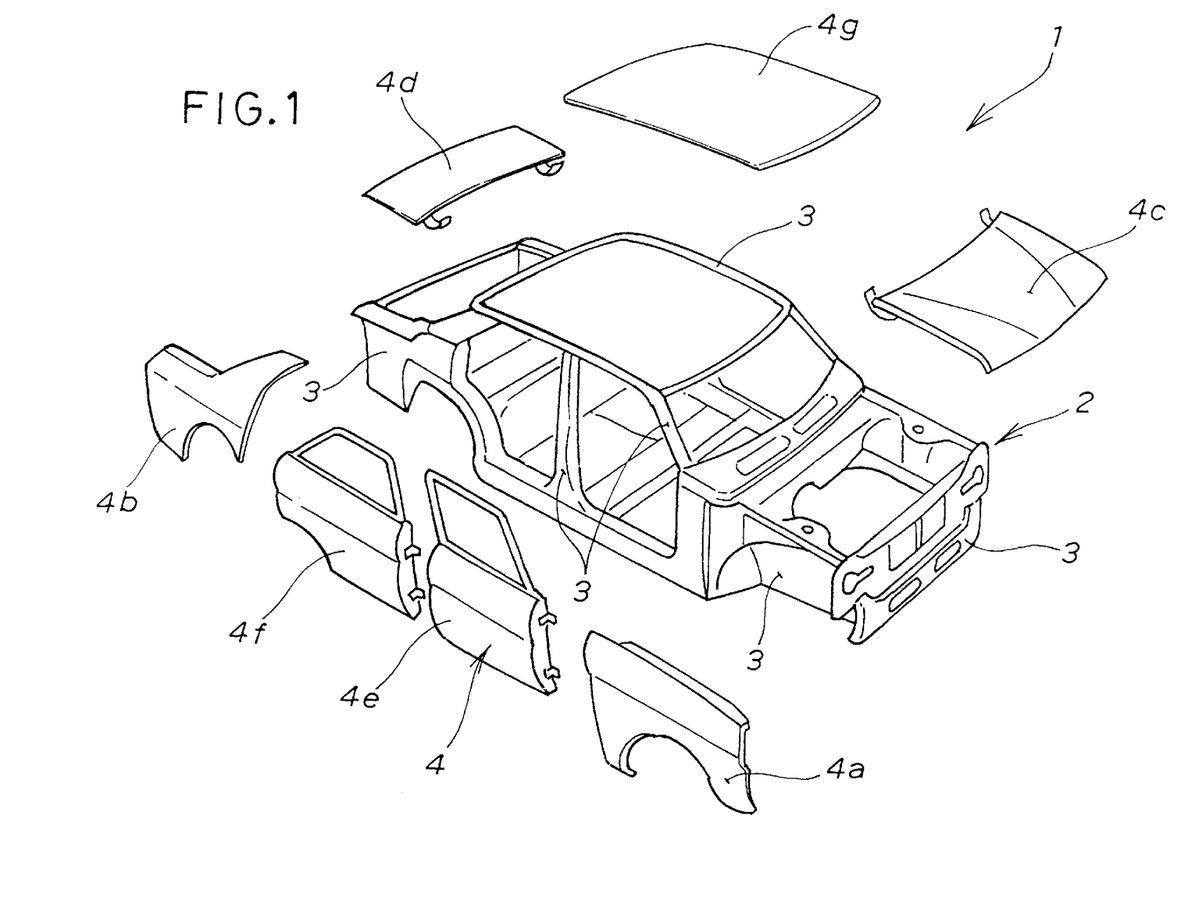
FIG. 1 is an exploded perspective view showing a chassis and exterior members for the vehicle body of an automobile.

Referring to FIG. 1, the construction of a vehicle body 1 is made of an assembly in which plural press-formed members obtained by press-forming a metal sheet, for example, an aluminum alloy sheet, are jointed together.

Inside members 3 which constitute the inside portion of the vehicle body 1 include plural members, for example, various inner panels such as floor panel members, pillar members, roof rail members, side sill members, bulk head members, and cloth members.

These plural inside members 3 are joined to form a chassis 2. Plural exterior members 4 which constitute outside members of the vehicle body are secured to the outside of the chassis 2.

The exterior members 4 specifically include fenders 4a and 4b which are respectively secured to the front and rear portions of each of the opposite sides of the chassis 2, a hood 4c for the front engine room, a rear trunk lid 4d, doors 4e and 4f which are respectively disposed in the front and rear portions of each of the opposite sides (since the automobile of the shown embodiment is a sedan type, there are four doors, but the invention may be applied to a two-door-type automobile or a five- or three-door-type automobile which is provided with a tail gate instead of a trunk lid), and a roof panel 4g which constitutes a roof exterior sheet.

The inside members 3 and the exterior members 4 which constitute the chassis 2 are formed by press forming as described above, and materials to be used for press forming are precoat aluminum alloy sheets in each of which the outer surfaces of an aluminum alloy sheet are previously coated with a lubricative coat and a rust-preventing coat.

Figure 2:
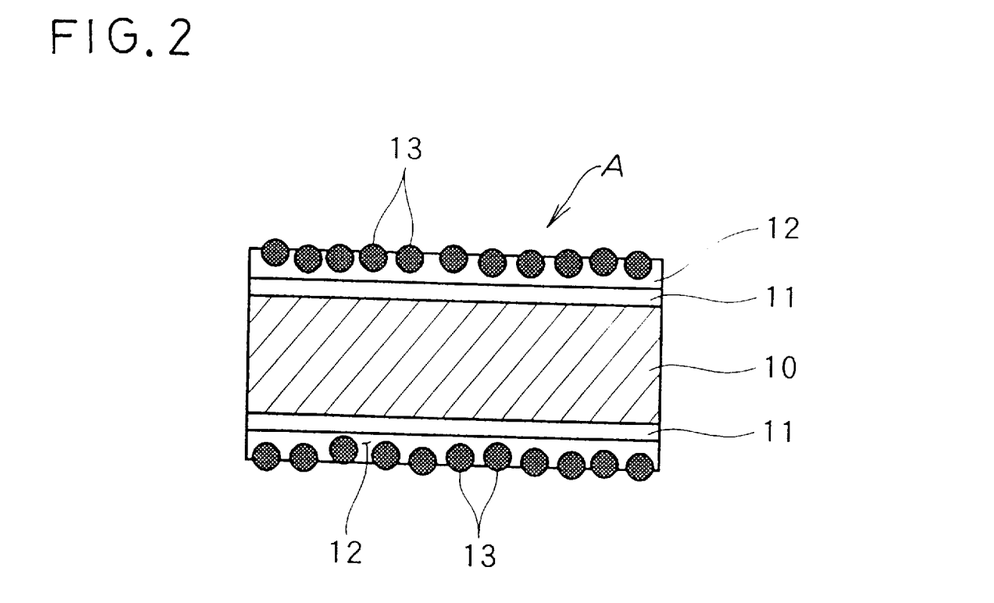
FIG. 2 is an enlarged vertical sectional view showing one example of a precoat aluminum alloy sheet material.
Figure 3:
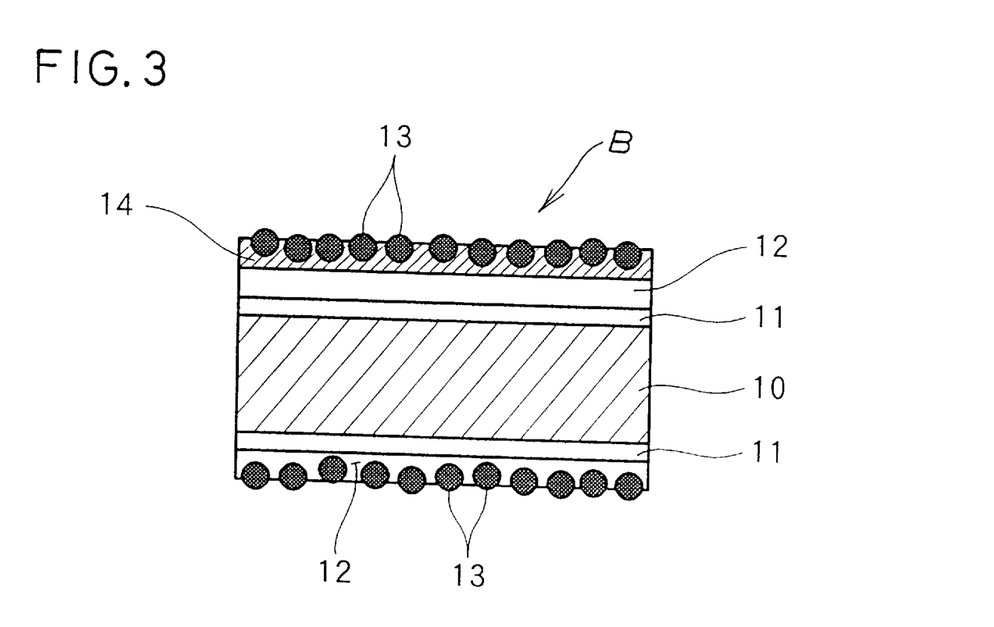
FIG. 3 is an enlarged vertical sectional view showing another example of a precoat aluminum alloy sheet material.

The precoat aluminum alloy sheets use, for example, a sheet material A (refer to FIG. 2) and a sheet material B (refer to FIG. 3). The sheet material A is a precoat aluminum alloy sheet each surface of which is coated with a base layer and an undercoat layer and which is suitable for constituting the inside members of the vehicle body 1, while the sheet material B is a precoat aluminum alloy sheet in which each surface (outer surface) of the sheet material A is coated with an intermediate coat layer and which is suitable for constituting the exterior members of the vehicle body 1.

In the case of the undercoat layer of the interior-member sheet material A, each outer surface of an aluminum alloy sheet is subjected to conversion treatment such as phosphating-chromating, whereby a rust-preventing adhesive coat is formed on each outer surface. The undercoat layer is stacked and formed on each outer surface of the aluminum alloy sheet subjected to the conversion treatment coat. As the undercoat layer, an organic coat agent which contains an epoxy resin and lubricating particles is applied to form an organic coat. This organic coat improves corrosion resistance, adhesion, and lubrication for forming.

In the case of the undercoat layer of the exterior-member sheet material B as well, treatment similar to that for the sheet material A is performed. As the undercoat layer, an organic coat agent which contains an epoxy resin is applied to form an organic coat, thereby improving corrosion resistance and adhesion.

An intermediate coat layer is stacked and formed on the undercoat layer. As the intermediate coat layer, an organic coat agent which contains a polyester resin and lubricating particles is applied to form an organic coat. This organic coat provides the sheet material B with light blocking characteristics which prevent degradation of the undercoat layer due to ultraviolet rays (weather resistance), as well as surface smoothness and lubrication, thereby improving the formability of the sheet material B.

The undercoat layers may be omitted from the sheet material B. In this case, however, there is a possibility that a rust-preventing function becomes inferior.

FIG. 2 is a cross-sectional view showing one example of the sheet material A suitable for constituting the inside members of the vehicle body 1.

Conversion treatment coats 11 and 11 are formed on both outside surfaces of an aluminum alloy sheet 10 by conversion treatment. Organic coats 12 and 12 each of which contains an epoxy resin and lubricating particles 13 and 13 are formed on the respective surfaces of the conversion treatment coats 11 and 11. The conversion treatment coats 11 and 11 and the organic coats 12 and 12 provide rust resistance and adhesion. In addition, the lubricating particles 13 and 13 contained in the organic coats 12 and 12 provide lubrication.

FIG. 3 is a cross-sectional view showing one example of the sheet material B suitable for constituting the exterior members of the vehicle body 1.

The coat structure of the sheet material B is basically similar to that of the sheet material A. Conversion treatment coats 11 and 11 are formed on both outside surfaces of an aluminum alloy sheet 10 by conversion treatment. Similarly to the organic coat 12 of the sheet material A, the organic coat 12 which contains an epoxy resin and the lubricating particles 13 is formed on the surface of the conversion treatment coat 11 which lies on the reverse side of the aluminum alloy sheet 10.

In addition, the organic coat 12 which contains an epoxy resin is formed on the surface of the conversion treatment coat 11 which lies on the obverse side of the aluminum alloy sheet 10. An organic coat 14 which contains a polyester resin and the lubricating particles 13 is stacked and formed on the surface of the organic coat 12 in order to provide lubrication, surface smoothness, and weather resistance which prevents degradation of the organic coat due to ultraviolet rays by means of light blocking characteristics.

By forming on the outer surface the organic coat 14 which contains the polyester resin and the lubricating particles 13, surface smoothness, weather resistance and lubrication are provided.

Figure 4:
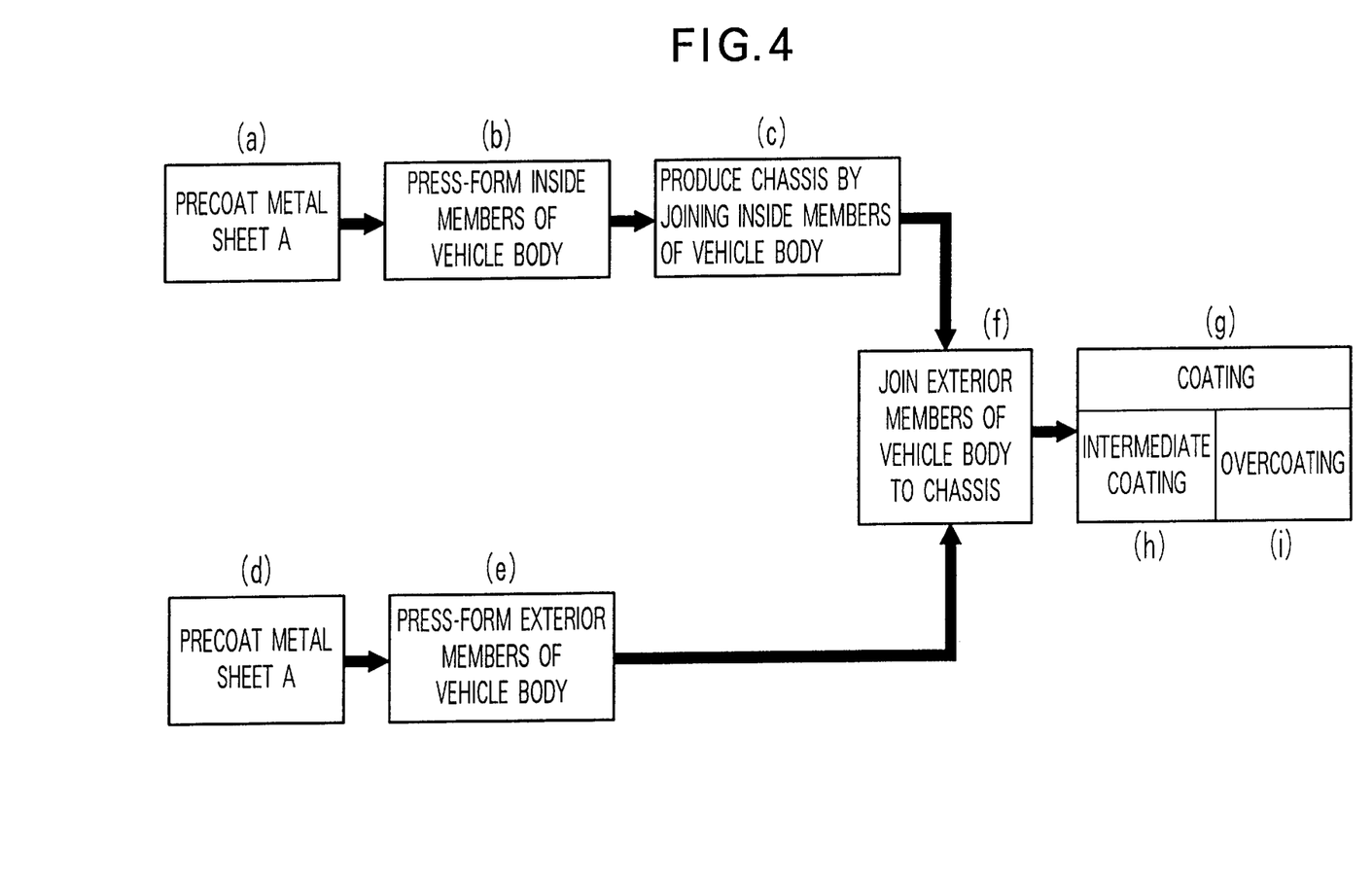
FIG. 4 is a flowchart showing a coating method according to a first embodiment.

FIG. 4 is a flowchart of a vehicle-body coating method according to a first embodiment. This embodiment uses a precoat aluminum alloy sheet made of the sheet material A.

The sheet material A shown in Step (a) of FIG. 4 is press-formed into the inside members of the vehicle body in Step (b) of FIG. 4. The press-formed inside members of the vehicle body are the plural inside members 3 described above with reference to FIG. 1, for example, various inner panels such as floor panels, pillars, roof rails, side sills, a bulk head, and cloth members. In Step (c), these inside members 3 obtained by press forming are joined and assembled to produce the chassis 2 which constitutes the skeleton of the vehicle body shown in FIG. 1.

In addition, the sheet material A shown in Step (d) of FIG. 4 is press-formed into exterior members for the vehicle body in Step (e) of FIG. 4. The press-formed exterior members of the vehicle body are the plural exterior members 4 described above with reference to FIG. 1, for example, the fenders 4a and 4b which are respectively disposed in the front and rear portions of each of the opposite sides of the chassis 2, the hood 4c for the front engine room, the rear trunk lid 4d, the doors 4e and 4f which are respectively disposed in the front and rear portions of each of the opposite sides of the chassis 2, and the roof panel 4g which constitutes the roof exterior sheet.

In Step (f), these press-formed exterior members are joined and assembled to the chassis 2. Thus, the exterior members 4 which constitute the outside portion of the vehicle body are joined and assembled to the chassis 2.

Since the chassis 2 is a member press-formed from the precoat aluminum alloy sheet A as described above, the chassis 2 has lubricative characteristics and is easy to press-form, and has rust-preventing characteristics and does not need the step of degreasing and cleaning the chassis 2 itself nor the step of forming a rust-preventing coat by immersion coating. The chassis 2 itself has a rust-preventing function, i.e., an aluminum alloy itself has a rust-preventing function. For this reason, there is no need for rust-preventing treatment of the chassis 2.

Since the exterior members 4 are formed from the sheet material A, the exterior members 4 need to be given an external appearance having an aesthetic effect or the like, surface smoothness and weather resistance. For this reason, the vehicle body in which the chassis 2 and the exterior members 4 have been joined and assembled in Step (f) is subjected to the coating shown in Step (g). In the coating step, it is sufficient to carry out only coating to give external appearance, surface smoothness, weather resistance and the like, because the chassis 2 provided with the undercoat layers, as described above, has a rust-preventing function and the exterior members 4 also have the undercoat layers as described above. Accordingly, in the coating step (g), it is sufficient to merely carry out intermediate coating (h) followed by overcoating (i) on the surfaces of the exterior members 4 which are exposed to the outside.

Figure 5:
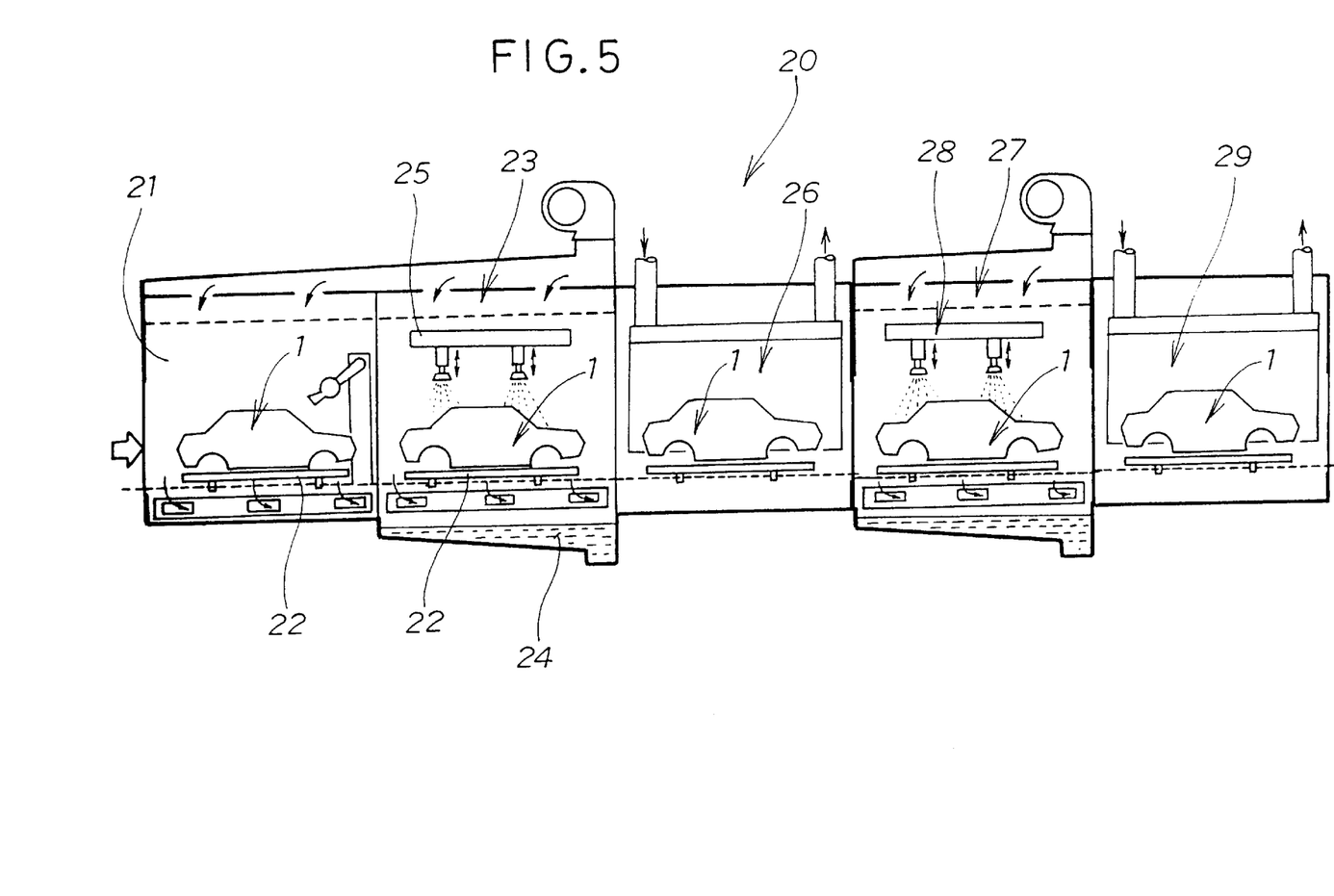
FIG. 5 is a schematic view showing one example of a coating line for a coating process.

FIG. 5 schematically shows one example of a coating line for use in the coating step (g) shown in FIG. 4.

As viewed in FIG. 5, the left and right sides of coating equipment 20 are upstream and downstream, respectively. The vehicle body 1 which is the assembly of the chassis 2 and the exterior members 4 assembled together in Step (f) of FIG. 4 is first transported to a cleaning room 21 for removing dust or the like which adheres to the outer surfaces of the vehicle body 1. The cleaning device used in the cleaning room 21 is, for example, an air blow device, and dust on the outer surfaces of the vehicle body 1 is removed in the cleaning room 21. The removed dust is evacuated from below a vehicle transporting pallet 22 and is removed at a removal tank 24 in which water is stored. The removal tank 24 is provided below an intermediate coating room 23 adjacent to the downstream side of the cleaning room 21.

The vehicle body 1 from which dust has been removed by air blow to clean the outer surfaces is transported by the vehicle transporting pallet 22 to the intermediate coating room 23 disposed adjacently to the downstream side of the cleaning room 21. In the intermediate coating room 23, the outer surfaces of the vehicle body 1 are subjected to intermediate coating using spray coating with an electrostatic coating device 25. An excess coating material and a floating coating material which have been sprayed by spray coating are removed at the removal tank 24 provided below the intermediate coating room 23.

A drying room 26 is disposed adjacently to the downstream side of the intermediate coating room 23. The vehicle body 1 for which intermediate coating has been completed in the intermediate coating room 23 is transported to the drying room 26, and the intermediate coat formed on the outer surfaces of the vehicle body 1 is dried and fixed in the drying room 26.

On the downstream side of the drying room 26, an overcoating room 27 is disposed adjacently to the drying room 26. The vehicle body 1 which has been dried and fixed after the completion of intermediate coating is transported to the overcoating room 27, and overcoating is applied to the intermediate coat formed on the outer surfaces of the vehicle body 1 by the electrostatic coating device 25.

After overcoating, the vehicle body 1 for which overcoating has been completed is transported to a drying room 29 adjacent to the downstream side of the overcoating room 27. In the drying room 29, the overcoat formed on the vehicle body 1 is dried and fixed by infrared rays, whereby all coating steps are completed.

Finally, the vehicle body 1 for which all coating steps have been completed is transported out of the drying room 29, and in a component-fitting step, various components are fitted to the vehicle body 1.

Figure 6:
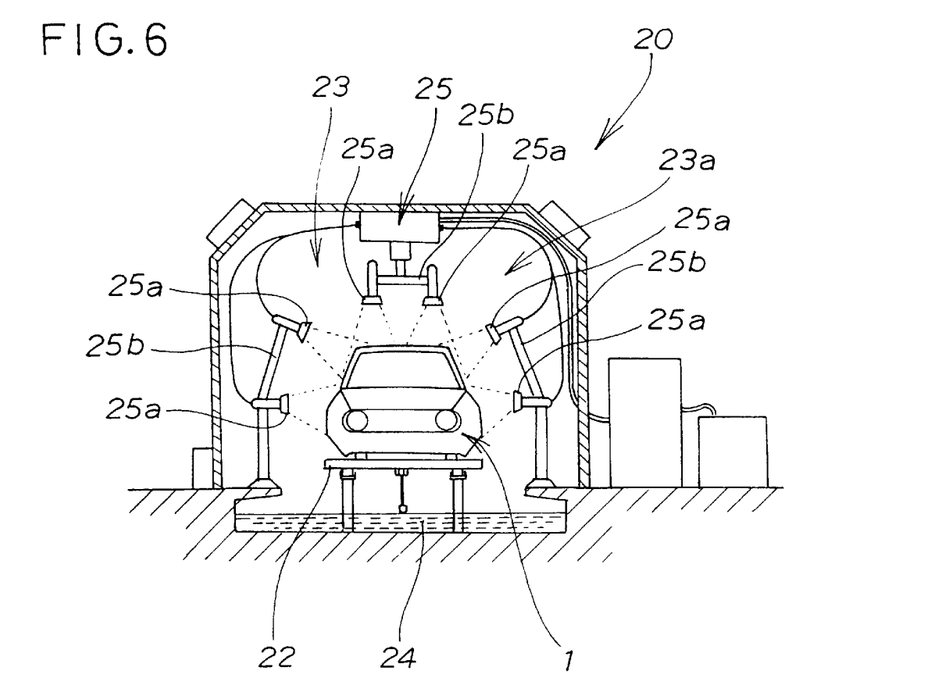
FIG. 6 is a schematic vertical sectional view showing one example of the coating room shown in FIG. 5.

FIG. 6 is a cross-sectional view showing one example of the coating room 23 or 27. FIG. 6 representatively shows the intermediate coating room 23, but the overcoating room 27 also has a similar structure.

The coating equipment 20 has a tunnel-like shape and is partitioned into individual rooms by shutters or the like. In a coating booth 23a, spray types of electrostatic coating guns 25a are disposed on both sides and on its ceiling. These coating guns 25a perform intermediate coating and overcoating on all the outer surfaces of the transported vehicle body 1 by means of robots 25b, thereby effecting finish coating of the outer surfaces of the vehicle body 1.

Figure 7:
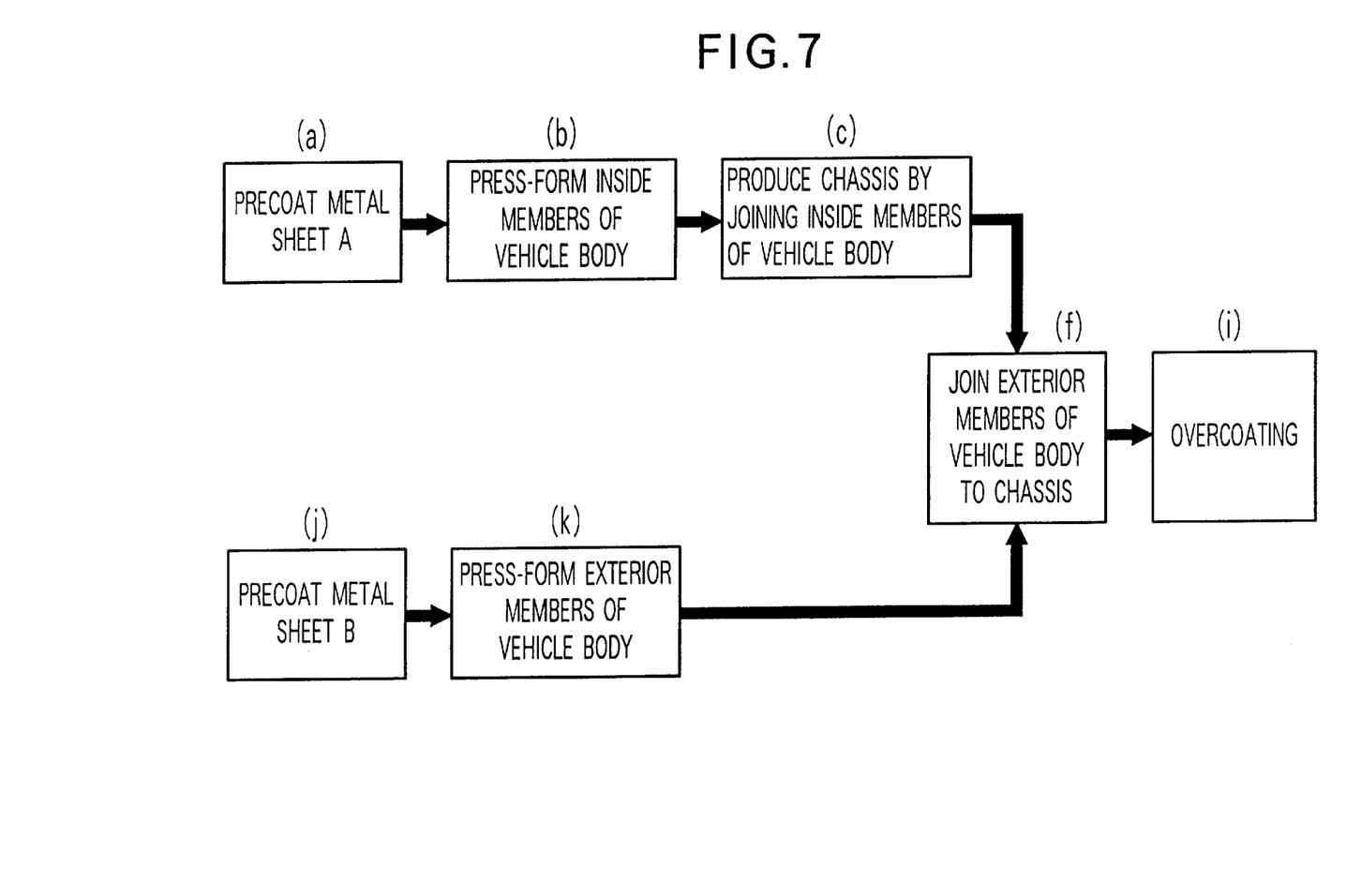
FIG. 7 is a flowchart showing a coating method according to a second embodiment.

FIG. 7 is a flowchart showing a vehicle-body coating method according to a second embodiment. In this embodiment, as in the case of the first embodiment, the aluminum alloy sheet material A is used as the material of the inside members which constitute the chassis of the vehicle body, and the sheet material B is used as an aluminum alloy sheet material which forms the exterior members which constitute the outer surfaces of the vehicle body 1.

As described previously with reference to FIG. 3 as one example, the aluminum alloy sheet material B is an aluminum alloy sheet in which the polymer resin coat 14 made of a material similar to that of the intermediate coat is formed over the obverse outer surface of the aluminum alloy sheet material A, so that the sheet material B itself has surface smoothness and weather resistance and enables intermediate coating to be omitted.

The precoat aluminum alloy sheet material A shown in Step (a) of FIG. 7 is press-formed into plural interior members for the vehicle body in Step (b) of FIG. 7 in a manner similar to Step (b) of FIG. 4 which shows the first embodiment. In Step (c) of FIG. 7, the plural inside members obtained by press forming are joined to produce the chassis 2.

In this embodiment, the precoat aluminum alloy sheet material B which needs no intermediate coating, shown in Step (j) of FIG. 7, is press-formed into the exterior members of the vehicle body in Step (k).

In Step (f), the exterior members of the vehicle body obtained in Step (k) are joined and assembled to the chassis obtained in Step (c).

In Step (i), overcoating is applied to the outer surfaces of the exterior members of the vehicle body assembled in Step (f), thereby completing the coating of the vehicle body. The vehicle body is transferred to a fitting step similarly to the first embodiment.

The coating method according to the second embodiment uses equipment in which, unlike the first embodiment shown in FIG. 5, the cleaning room 21 and the overcoating room 27 are directly connected to each other by omitting the intermediate coating 23 and the drying 26 following the removal of dust from the vehicle body in the cleaning room 21. In the coating method according to the second embodiment, overcoating is directly applied to the cleaned vehicle body and the overcoated vehicle body is transferred to a drying and fixing step, thereby completing the entire coating process.

A coating method according to a third embodiment will be described below. The coating method according to the third embodiment uses a sheet material, profiles and castings, each made of an aluminum alloy material, as chassis constituent members, but since the third embodiment is similar in process to the first embodiment shown in FIG. 4, the coating method according to the third embodiment will be described with reference to FIG. 4.

The chassis constituent members shown in Step (b) of FIG. 4 are formed from the profiles, the castings and the like in addition to the above-described sheet material. The material of these members is an aluminum alloy. The aluminum alloy has rust-preventing characteristics. For this reason, there may be no need for a precoat.

The sheet material may use the above-described precoat aluminum alloy sheet. The profiles may use those having a surface over which a conversion treatment coat is formed in advance. The castings may likewise use those having a surface over which a conversion treatment coat is formed.

Incidentally, the chassis in which the sheet material, the profiles and the castings of the aluminum alloy material are joined may be subjected to simple conversion treatment so that a conversion treatment coat is formed over the surfaces of the chassis.

After the production of the chassis, the step of joining the chassis and the exterior members as well as the coating step including intermediate coating and overcoating are performed as shown in Steps (f) to (i) of FIG. 4, whereby the entire coating process is completed.

A coating method according to a fourth embodiment will be described below. The coating method according to the fourth embodiment uses a sheet material, profiles and castings, each made of an aluminum alloy material, as chassis constituent members, but since the fourth embodiment is similar in process to the second embodiment shown in FIG. 7, the coating method according to the fourth embodiment will be described with reference to FIG. 7.

The chassis constituent members shown in Step (b) of FIG. 7 are formed from the profiles, the castings and the like in addition to the above-described sheet material. The material of these members is an aluminum alloy. The aluminum alloy has rust-preventing characteristics. For this reason, there may be no need for a precoat.

The sheet material may use the above-described precoat aluminum alloy sheet. The profiles may use those having a surface over which a conversion treatment coat is formed in advance. The castings may likewise use those having a surface over which a conversion treatment coat is formed.

Incidentally, the chassis in which the sheet material, the profiles and the castings of the aluminum alloy material are joined may be subjected to simple conversion treatment so that a conversion treatment coat is formed over the surfaces of the chassis.

After the production of the chassis, the step of joining the chassis and the exterior members as well as the coating step including intermediate coating and overcoating are performed as shown in Steps (f) to (i) of FIG. 7, whereby the entire coating process is completed.

In the above description of each of the embodiments, the members which constitute the vehicle body are made of an aluminum alloy sheet material, but a steel sheet material precoated by a technique similar to the above-described one may also be used instead of the aluminum alloy sheet material.

The individual members which constitute the chassis are joined and assembled by welding, riveting or screwing. The exterior members are joined to the chassis by riveting, screwing or the like.

In the joining and assembling of the chassis, if the aluminum alloy sheet material is selected for the inside members, part of or essential ones of the inside members may be joined by welding, since the aluminum alloy sheet material has rust-preventing characteristics.

It is preferable that the exterior members be joined to the chassis by riveting or screwing. When the exterior members are to be joined by welding, marks left by welding can be covered by coating during intermediate coating or overcoating as in the case of the first embodiment. Moreover, when only overcoating is performed as in the case of the second embodiment, small marks left by welding can be covered by coating.

What is claimed is:

1. A vehicle body coating method for an automobile, comprising the steps of:

preparing a first precoat metal sheet having a rust-preventive layer and a first organic coat containing a lubricating component formed in that order on both surfaces of a first base metal sheet, the first precoat metal sheet further having a second organic coat containing a lubricating component and formed on the first organic coat on only one side of the first base metal sheet;

preparing a second precoat metal sheet having a rust-preventive layer and a third organic coat containing a lubricating component formed in that order on both surfaces of a second base metal sheet;

press-forming said first precoat metal sheet into plural exterior members, including a bonnet, a trunk lid, doors and fenders, which constitute an outside of a vehicle body, in such a manner that said second organic coat of the first precoat sheet metal forms an obverse surface of each of the exterior members;

press-forming said second precoat-metal sheet into plural inside members, including a floor panel and an inner panel, which constitute an inside of the vehicle body, and joining the inside members to produce a chassis for an automobile;

joining the exterior members to the chassis with the obverse surfaces of the respective exterior members facing outward; and performing overcoating on only the obverse surfaces of the exterior members joined to the chassis.

2. A vehicle body coating method for an automobile according to claim 1, wherein the first organic coat contains an epoxy resin and the lubricating component, and the second organic coat contains a polyester resin and the lubricating component.

3. A vehicle body coating method for an automobile according to claim 1, wherein said first base metal sheet is made of an aluminum alloy.

4. A vehicle body coating method for an automobile according to claim 3, wherein said second base metal sheet is made of an aluminum alloy.

5. A vehicle body coating method for an automobile, comprising the steps of:

preparing a precoat metal sheet having a rust-preventive layer and a first organic cost containing a lubricating component formed in that order on both surfaces of a base metal sheet, the precoat metal sheet further having a second organic coat containing a lubricating component and formed on the first organic coat on only one side of the base metal sheet;

press-forming the precoat metal sheet into plural exterior members, including a bonnet, a trunk lid, doors and fenders, which constitute an outside of a vehicle body, in such a manner that said second organic coat of the precoat sheet metal forms an obverse surface of each of the exterior members;

forming plural chassis constituent members from sheet materials, profiles or castings, each made of an aluminum alloy, and joining the chassis constituent members to produce a chassis for an automobile;

joining the exterior members to the chassis with the obverse surfaces of the respective exterior members facing outward; and performing overcoating on only the obverse surfaces of the exterior members joined to the chassis.

6. A vehicle body coating method for an automobile according to claim 5, wherein the first organic coat contains an epoxy resin and the lubricating component, and the second organic coat contains a polyester resin and the lubricating component.

7. A vehicle body coating method for an automobile according to claim 5, wherein the base sheet metal is made of an aluminum alloy.

* * * * *